US010063720B2

(12) United States Patent
Fukushima

(10) Patent No.: US 10,063,720 B2
(45) Date of Patent: Aug. 28, 2018

(54) RELAY SERVER ENABLING RESUMPTION OF REMOTE SUPPORT, METHOD OF CONTROLLING THE SAME, COMMUNICATION SYSTEM AND STORAGE MEDIUM

(71) Applicant: CANON KABUSHIKI KAISHA, Tokyo (JP)

(72) Inventor: Kenta Fukushima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/492,086

(22) Filed: Apr. 20, 2017

(65) Prior Publication Data

US 2017/0310832 A1 Oct. 26, 2017

(30) Foreign Application Priority Data

Apr. 25, 2016 (JP) ................. 2016-087385

(51) Int. Cl.
*G06F 3/12* (2006.01)
*H04N 1/00* (2006.01)

(52) U.S. Cl.
CPC ......... *H04N 1/00344* (2013.01); *G06F 3/121* (2013.01); *G06F 3/1236* (2013.01); *G06F 3/1288* (2013.01); *H04N 1/00244* (2013.01); *H04N 1/00408* (2013.01); *H04N 2201/0094* (2013.01)

(58) Field of Classification Search
None
See application file for complete search history.

(56) References Cited

U.S. PATENT DOCUMENTS

| 9,389,816 B2 | 7/2016 | Nishiyama | |
|---|---|---|---|
| 2002/0194214 A1* | 12/2002 | Fukazawa | H04N 1/00002 715/229 |
| 2007/0300291 A1* | 12/2007 | Bomgaars | H04L 12/2856 726/3 |
| 2008/0104252 A1* | 5/2008 | Henniger | H04L 67/14 709/227 |
| 2009/0077184 A1* | 3/2009 | Brewer | H04W 76/022 709/206 |
| 2011/0099272 A1* | 4/2011 | Takahashi | G06F 11/0733 709/224 |

(Continued)

FOREIGN PATENT DOCUMENTS

JP 2015037259 A 2/2015

*Primary Examiner* — Henok A Shiferaw
(74) *Attorney, Agent, or Firm* — Rossi, Kimms & McDowell LLP

(57) ABSTRACT

A relay server associates an account of an MFP (image processing apparatus) and an account of an operator PC (information processing apparatus) in a case where remote support for the MFP by the operator PC is started by using a support room assigned to the MFP. In a case where an extension of the remote support is requested from the operator PC after a reconnection by the MFP is performed, the relay server identifies a support room newly assigned, due to the reconnection, to the MFP 101 that is the target of the remote support, based on the account of the MFP associated with the account of the operator PC. The relay server transmits to the operator PC a support room ID corresponding to the identified support room.

13 Claims, 10 Drawing Sheets

(56) References Cited

U.S. PATENT DOCUMENTS

2013/0042232 A1\* 2/2013 Hirokawa ................ G06F 8/61
717/174
2013/0321849 A1\* 12/2013 Masui ................ G06K 15/1809
358/1.14

\* cited by examiner

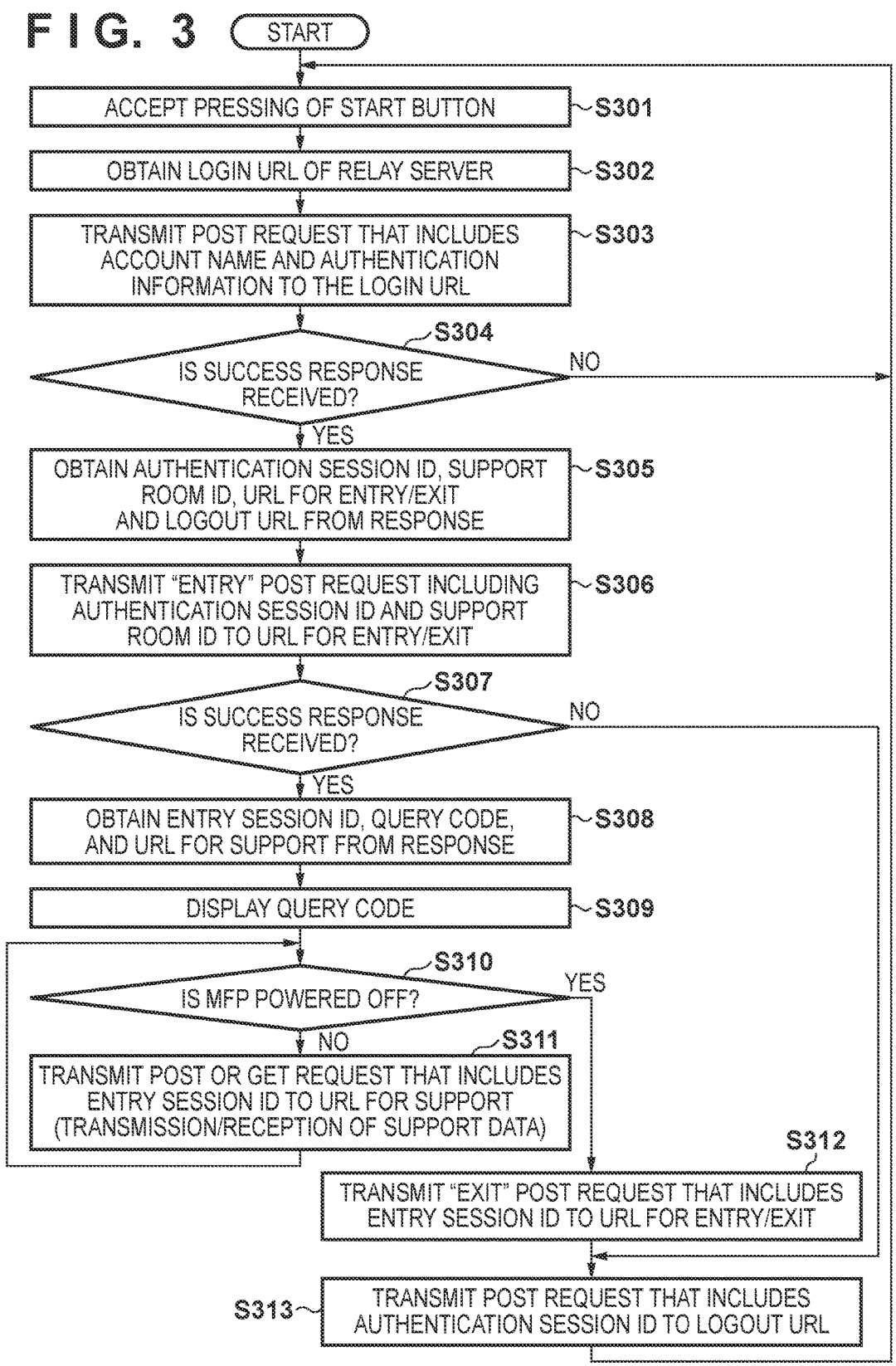

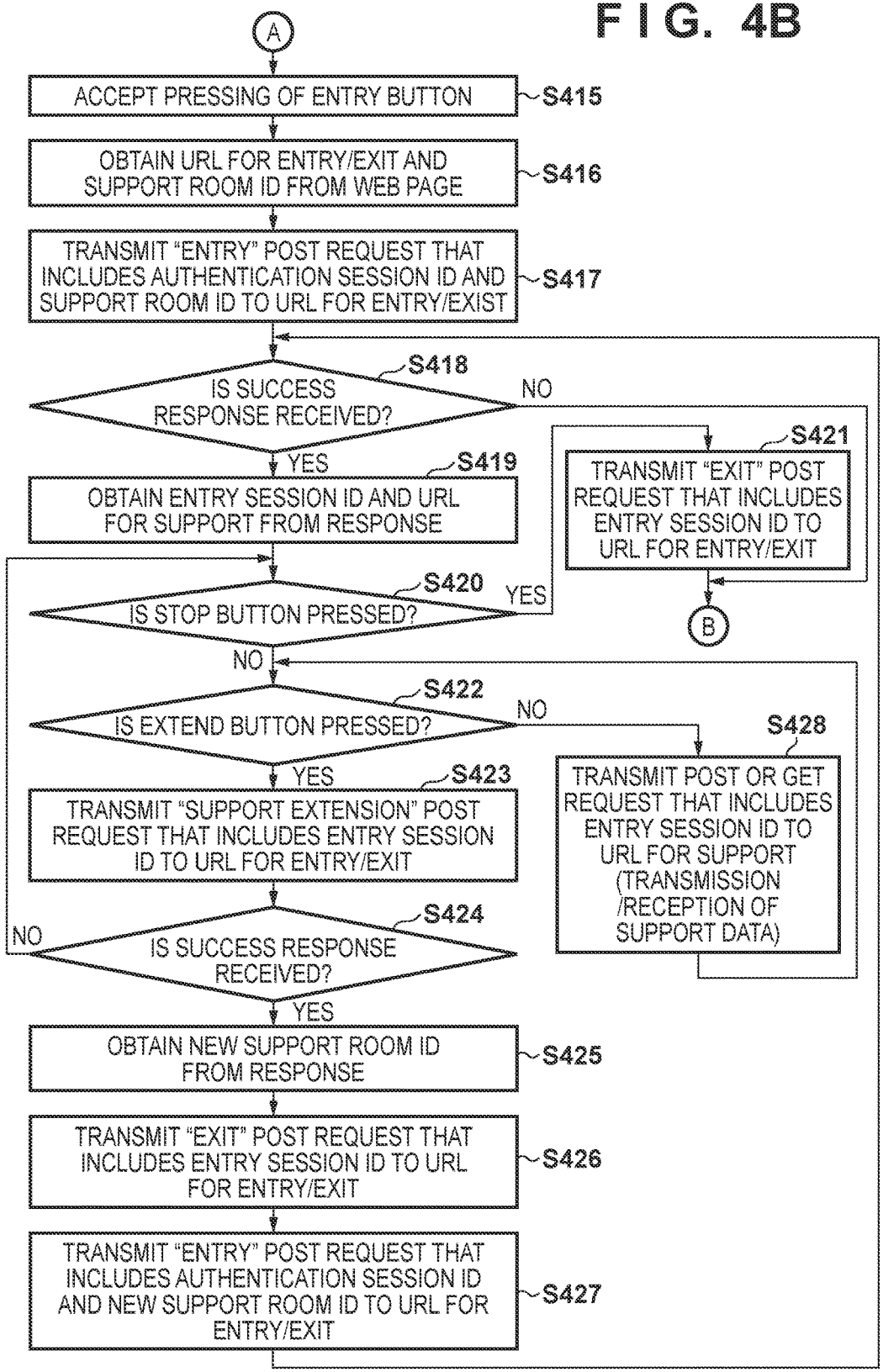

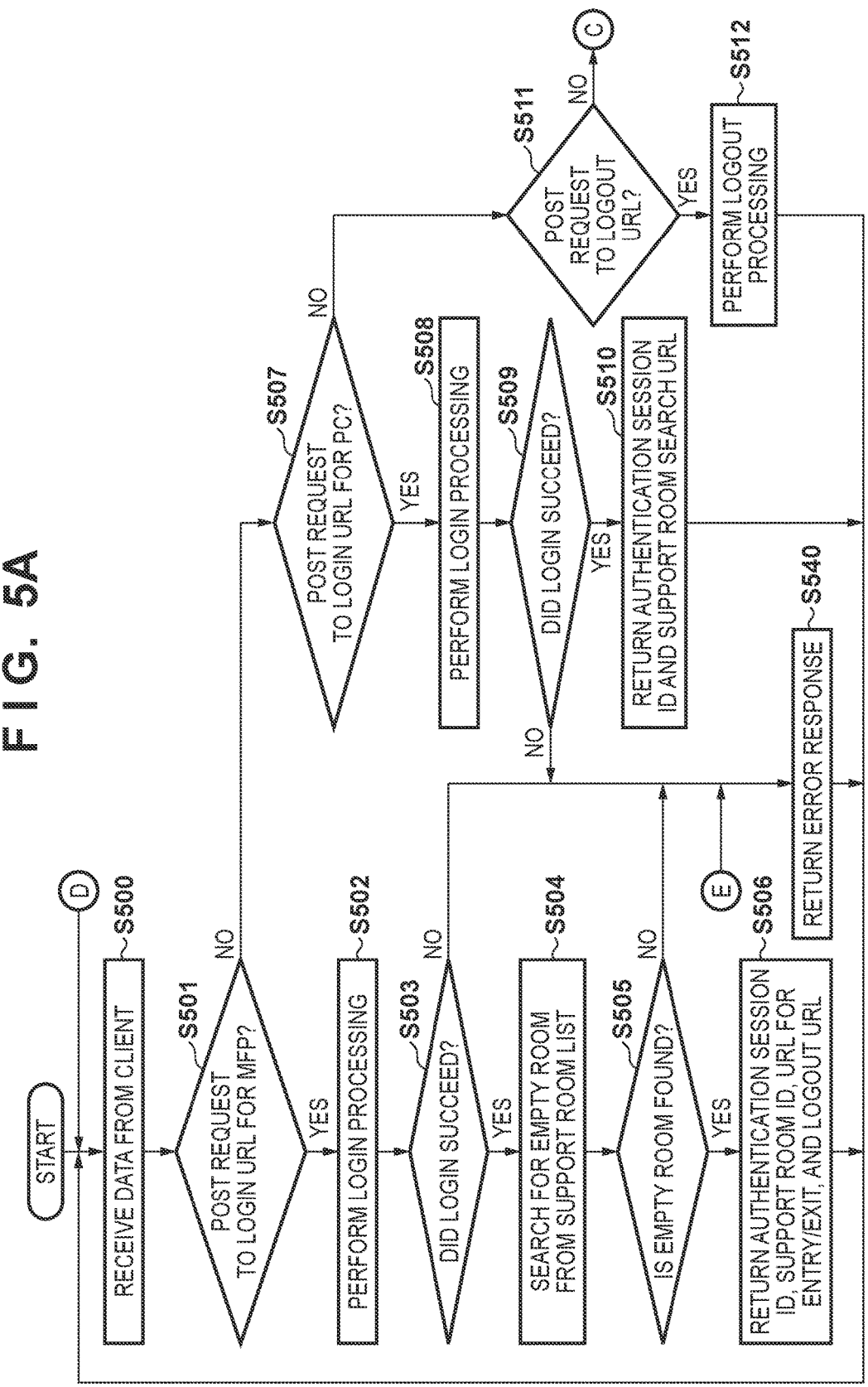

SUPPORT ROOM LIST

| SUPPORT ROOM ID | QUERY CODE | ENTRY SESSION ID | ACCOUNT LIST |
|---|---|---|---|
| 100001 | | | |
| 100002 | 2041 | awd9uajwa | Mfp03 |
| 100003 | 1301 | Ashoifnirbb | Mfp02 |
| | | pornvrgysn | User01 |
| 100004 | 6937 | | Mfp03 |
| | | hoeghusnc | User05 |

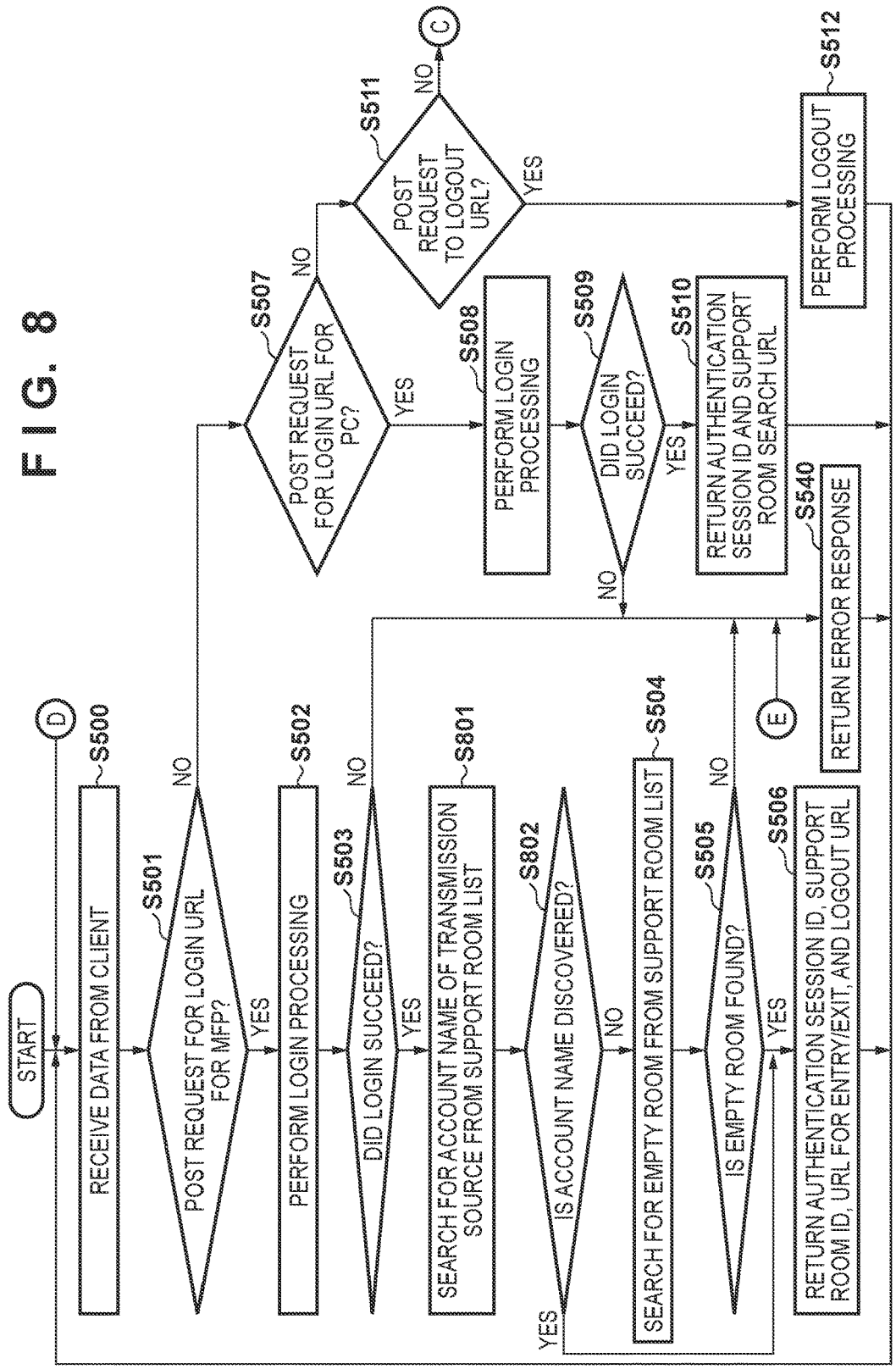

RELAY SERVER ENABLING RESUMPTION OF REMOTE SUPPORT, METHOD OF CONTROLLING THE SAME, COMMUNICATION SYSTEM AND STORAGE MEDIUM

BACKGROUND OF THE INVENTION

Field of the Invention

The present invention relates to a relay server, a method of controlling the same, a communication system, and a storage medium.

Description of the Related Art

In recent years, remote maintenance services by audio and moving image communication and remote operation have been proposed for an image processing apparatus such as a multifunction peripheral (MFP). In a remote maintenance service, it is possible to solve an error at a time of an occurrence of an error in the multifunction peripheral by an operator of a call-center performing a remote operation for a multifunction peripheral or by an operator of a call-center directly conveying an error solving method to a user by audio and moving image communication. By this, a shortening of the time necessary to solve an error is possible without it being necessary for a worker to go to a site for maintenance.

In this kind of remote maintenance service, it is effective to realize a connection to an operator PC of the call-center using a communication means of the multifunction peripheral without the user using an apparatus other than the multifunction peripheral such as a telephone device or a PC. Regarding this point, in an office in which a multifunction peripheral exists, because a firewall (FW) is generally installed, it is necessary to establish a session via the FW between the multifunction peripheral (information terminal) and the operator PC of the call-center (information terminal). Normally, a connection by HTTP to an Internet side from the information terminal inside the FW is permitted while a connection from the Internet side to the information terminal inside the FW is restricted. For this reason, by the two information terminals respectively establishing connections with a session management server (relay server) to which they can connect as HTTP clients, a session between the information terminals can be established via the relay server.

In this kind of system, the establishment of the session between the multifunction peripheral and the operator PC of the call-center is performed by the following procedure, for example. When the multifunction peripheral connects to the relay server, the relay server issues a "query code" to the multifunction peripheral as an identifier for communication with the multifunction peripheral. The user of the multifunction peripheral conveys the issued query code by a telephone call or the like to the operator of the call-center. The operator of the call-center inputs the query code elicited from the user of the multifunction peripheral to a system. By this, the session between the multifunction peripheral and the relay server is established and the remote maintenance service is started.

In the remote maintenance service, there is a case in which the multifunction peripheral restarts by a remote operation or instruction from the call-center side according to maintenance details or trouble details. For example, a restart of the multifunction peripheral is performed in a case where a setting change that becomes valid after a restart is performed or in a case where a malfunction occurs in the device. At a time of a restart of the multifunction peripheral, the remote maintenance of the multifunction peripheral cannot be performed because the session between the multifunction peripheral and the relay server is disconnected. However, it may be necessary for the remote maintenance to be continued after a restart of the multifunction peripheral in order to perform a verification of a setting after a change or to perform a continuation of maintenance work. A technique for automatically connecting at a time of a restart of the multifunction peripheral to a relay server based on information stored prior to a restart is proposed in Japanese Patent Laid-Open No. 2015-037259 as a technique for continuing a remote maintenance. This makes it unnecessary for a user to once again perform an operation for connecting to the relay server from the multifunction peripheral.

By virtue of the foregoing technique, when a multifunction peripheral during a continuation of a remote maintenance (maintenance work by a remote support) restarts, effort of a user of the multifunction peripheral can be reduced because the multifunction peripheral automatically reconnects to the relay server. Meanwhile, there is a possibility that effort of an operator of a call-center cannot be reduced. This is because, in many cases, a new identifier is issued to the multifunction peripheral from the relay server as an identifier (query code) for communication when reconnecting to the relay server. In this case, it is not possible to establish a session between the multifunction peripheral and the operator PC via the relay server to resume the remote maintenance, without the operator of the call-center again eliciting the identifier from the user of the multifunction peripheral and inputting it to the system.

SUMMARY OF THE INVENTION

The present invention has been conceived in view of the above described issues. The present invention provides, in a communication system in which an information processing apparatus (operator PC) performs a remote support for an image processing apparatus (multifunction peripheral) via a relay server, a technique for resuming by a simpler procedure the remote support interrupted due to a restart of the image processing apparatus.

According to one aspect of the present invention, there is provided a relay server that relays communication between at least one image processing apparatus and at least one information processing apparatus that performs remote support for the image processing apparatus, comprising: a memory device that stores a set of instructions; and at least one processor that executes the instructions to: manage a plurality of memory regions on the relay server each of which is used for a relay of communication for the remote support between an image processing apparatus and an information processing apparatus; assign, for each connection being made from the image processing apparatus, one of the plurality of memory regions to the image processing apparatus as a memory region to be used for undergoing the remote support; associate identification information of the image processing apparatus with identification information of the information processing apparatus in a case where the remote support for the image processing apparatus is started by the information processing apparatus; and in a case where an extension of the remote support is requested from the information processing apparatus after a reconnection by the image processing apparatus is performed, identify a memory region newly assigned, in accordance with the reconnection, to the image processing apparatus that is a target of the remote support, based on the identification information of the image processing apparatus associated with the identification information of the information processing apparatus, and transmit information for using the identified memory region to the information processing apparatus.

According to another aspect of the present invention, there is provided a relay server that relays communication between at least one image processing apparatus and at least one information processing apparatus that performs remote support for the image processing apparatus, comprising: a memory device that stores a set of instructions; and at least one processor that executes the instructions to: manage a plurality of memory regions each of which is used for a relay of communication for the remote support between an image processing apparatus and an information processing apparatus; assign, for each connection being made from the image processing apparatus, one of the plurality of memory regions to the image processing apparatus as a memory region to be used for undergoing the remote support; associate identification information of the image processing apparatus with identification information of the information processing apparatus in a case where the remote support for the image processing apparatus is started by the information processing apparatus; and in a case where a reconnection by the image processing apparatus is performed, identify a memory region that the image processing apparatus was using prior to the reconnection, based on the identification information of the information processing apparatus associated with the identification information of the image processing apparatus, and assign the identified memory region to the image processing apparatus; and in a case where an extension of the remote support is requested from the information processing apparatus after the reconnection by the image processing apparatus is performed, transmit information for using the identified memory region to the information processing apparatus.

According to still another aspect of the present invention, there is provided a communication system comprising: a relay server, at least one image processing apparatus, and at least one information processing apparatus that performs remote support for the image processing apparatus by communicating with the image processing apparatus via the relay server, wherein the relay server comprises: a memory device that stores a set of instructions; and at least one processor that executes the instructions to: manage a plurality of memory regions on the relay server each of which is used for a relay of communication for the remote support between an image processing apparatus and an information processing apparatus; assign, for each connection being made from the image processing apparatus, one of the plurality of memory regions to the image processing apparatus as a memory region to be used for undergoing the remote support; associate identification information of the image processing apparatus with identification information of the information processing apparatus in a case where the remote support for the image processing apparatus is started by the information processing apparatus; and in a case where an extension of the remote support is requested from the information processing apparatus after a reconnection by the image processing apparatus is performed, identify a memory region newly assigned, in accordance with the reconnection, to the image processing apparatus that is a target of the remote support, based on the identification information of the image processing apparatus associated with the identification information of the information processing apparatus, and transmit information for using the identified memory region to the information processing apparatus.

According to yet another aspect of the present invention, there is provided a method of controlling a relay server that relays communication between at least one image processing apparatus and at least one information processing apparatus that performs remote support for the image processing apparatus, comprising: managing a plurality of memory regions on the relay server each of which is used for a relay of communication for the remote support between an image processing apparatus and an information processing apparatus; assigning, for each connection being made from the image processing apparatus, one of the plurality of memory regions to the image processing apparatus as a memory region to be used for undergoing the remote support; associating identification information of the image processing apparatus with identification information of the information processing apparatus in a case where the remote support for the image processing apparatus is started by the information processing apparatus; and in a case where an extension of the remote support is requested from the information processing apparatus after a reconnection by the image processing apparatus is performed, identifying a memory region newly assigned, in accordance with the reconnection, to the image processing apparatus that is a target of the remote support, based on the identification information of the image processing apparatus associated with the identification information of the information processing apparatus, and transmitting information for using the identified memory region to the information processing apparatus.

According to still yet another aspect of the present invention, there is provided a non-transitory computer readable storage medium storing a program for causing a processor to execute instructions to: manage a plurality of memory regions on a relay server each of which is used for a relay of communication for remote support between an image processing apparatus and an information processing apparatus; assign, for each connection being made from the image processing apparatus, one of the plurality of memory regions to the image processing apparatus as a memory region to be used for undergoing the remote support; associate identification information of the image processing apparatus with identification information of the information processing apparatus in a case where the remote support for the image processing apparatus is started by the information processing apparatus; and in a case where an extension of the remote support is requested from the information processing apparatus after a reconnection by the image processing apparatus is performed, identify a memory region newly assigned, in accordance with the reconnection, to the image processing apparatus that is a target of the remote support, based on the identification information of the image processing apparatus associated with the identification information of the information processing apparatus, and transmit information for using the identified memory region to the information processing apparatus.

By virtue of the present invention, in a communication system in which an information processing apparatus (operator PC) performs a remote support for an image processing apparatus (multifunction peripheral) via a relay server, it becomes possible to resume by a simpler procedure the remote support interrupted due to a restart of the image processing apparatus.

Further features of the present invention will become apparent from the following description of exemplary embodiments (with reference to the attached drawings).

BRIEF DESCRIPTION OF THE DRAWINGS

FIG. 3 is a flowchart illustrating a procedure of processing of an MFP.

FIG. 4B is a flowchart illustrating a procedure of processing of an operator PC.

FIG. 5A is a flowchart illustrating a procedure of processing of a relay server (first embodiment).

FIG. 8 is a flowchart illustrating a procedure of processing of a relay server (second embodiment).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

<Network Configuration of Remote Support System>

Figure 1:
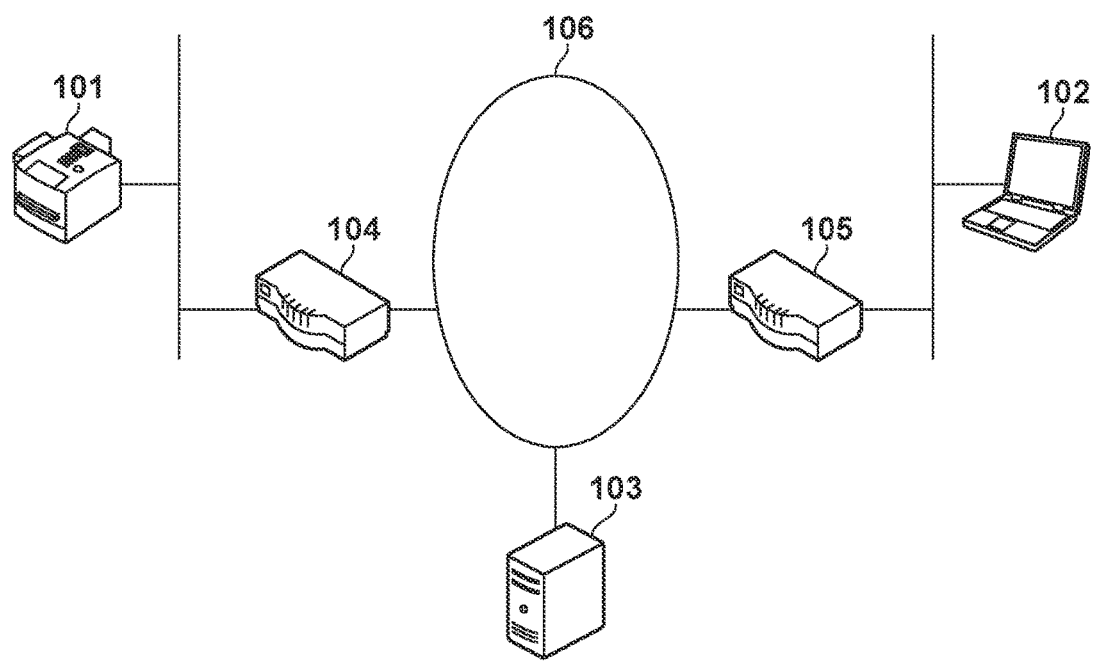
FIG. 1 illustrates a network configuration example of a remote support system.

FIG. 1 illustrates a network configuration example of a remote support system according to a first embodiment. As illustrated in FIG. 1, the remote support system (communication system) is configured by an MFP (image processing apparatus) 101, an operator PC (information processing apparatus) 102, and a relay server 103 that are capable of communicating with each other via a network 106. The MFP 101 and the operator PC 102 are equipped with a data communication function of executing a data communication by executing call control by HTTP (Hypertext Transfer Protocol). In the remote support system illustrated in FIG. 1, the MFP 101 is connected to the network 106 through a firewall (FW) 104 and the operator PC 102 of a call-center side is connected to the network 106 through a FW 105. Additionally, the relay server 103 is connected to the network 106. In the present embodiment, the operator PC 102 performs a remote support of the MFP 101 by communicating with the MFP 101 via the relay server 103.

For data communication by HTTP, client nodes can implement data communication with each other by performing POST/GET to a URI (Uniform Resource Identifier) which is provided from the relay server (the relay server 103 in the present embodiment). This makes it possible for client nodes to perform data communication with each other even if they are blocked by a private address area or an FW. In the present embodiment, the MFP 101 and the operator PC 102 operate as HTTP client nodes.

Note, in in the present embodiment, although a network configuration in which each client node connects to the network 106 via an FW to perform communication is used, a network configuration in which each client node connects to the network 106 without going through the FW may be used. Also, any number of FWs, MFPs, and operator PCs can connect to the network 106. In the present embodiment, although the MFP 101 and the operator PC 102 use HTTP as a communication protocol, a communication protocol other than HTTP may be used.

<Hardware Configuration of Remote Support System>

Figure 2:
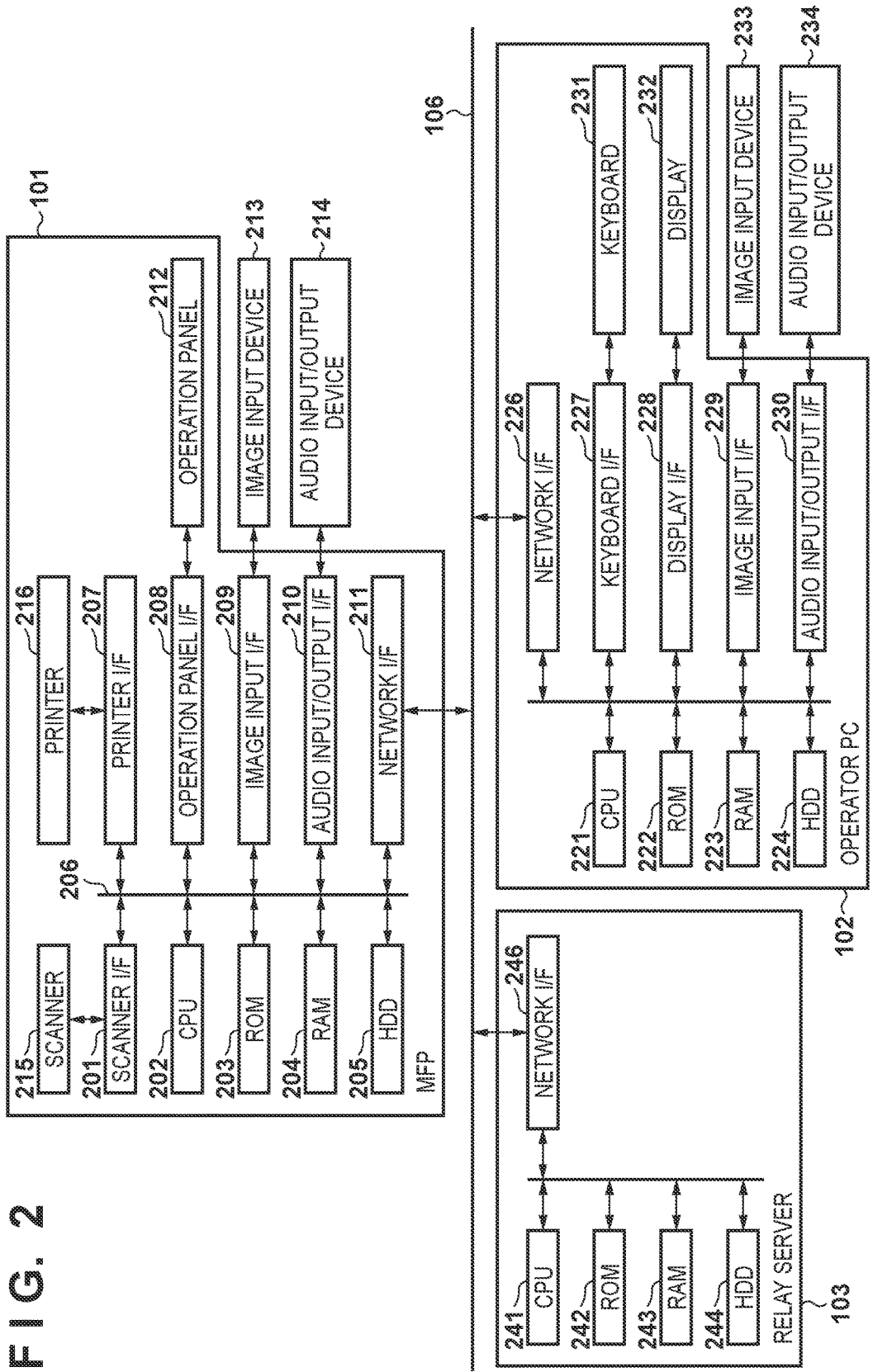
FIG. 2 is a block diagram illustrating an example of a hardware configuration of a remote support system.

FIG. 2 is a block diagram illustrating an example of a hardware configuration of a remote support system according to the present embodiment. Note, the FWs 104 and 105 illustrated in FIG. 1 are omitted in FIG. 2. In the MFP 101, a CPU 202 comprehensively controls access with various devices connected to a system bus 206 based on a control program stored in a ROM 203 or a hard disk (HDD) 205. The ROM 203 stores control programs and the like that the CPU 202 can execute. A RAM 204 mainly functions as a main memory, a work area, or the like, of the CPU 202, and is configured such that a memory capacity can be extended by an option RAM connected to an expansion port (not shown). The HDD 205 stores various data such as a boot program, various applications, font data, user files, and edit files. Note, an SD card, a flash memory, and the like may be used as an external storage device in addition to the HDD 205.

A scanner I/F 201 controls input of an image from a scanner 215. A printer I/F 207 controls output of an image to a printer 216. An operation panel I/F 208 controls a display of an operation panel 212 and controls input of various setting information that indicate details that are set in the operation panel 212. An image input I/F 209 controls input of images from an image input device 213 such as a camera or the like. An audio input/output I/F 210 controls audio input/output with an audio input/output device such as a headset. A network I/F 211 is connected to an external network via a network cable and performs data communication with an external apparatus via the external network. Note, in the present embodiment, the network I/F 211 is connected to the network 106 via the FW 104 as illustrated in FIG. 1.

In the operator PC 102, a CPU 221 comprehensively controls access with various devices connected to a system bus 225 based on a control program stored in a ROM 222 or an HDD 224. The ROM 222 stores control programs and the like that the CPU 221 can execute. A RAM 223 mainly functions as a main memory, a work area, or the like, of the CPU 221, and is configured such that a memory capacity can be extended by an option RAM connected to an expansion port (not shown). The HDD 224 stores a boot program, various applications, font data, user files, and edit files. Note, an SD card, a flash memory, and the like may be used as an external storage device in addition to the HDD 224. A network I/F 226 is connected to an external network via a network cable and performs data communication with an external apparatus via the external network. Note, in the present embodiment, the network I/F 226 is connected to the network 106 via the FW 105 as illustrated in FIG. 1.

A keyboard I/F 227 controls a key input from a keyboard 231 or a pointing device (not shown). A display I/F 228 controls displaying of a display 232. An image input I/F 229 controls an input of images from an image input device 233 such as a camera. An audio input/output I/F 230 controls audio input/output with an audio input/output device 234 such as a headset.

In the relay server 103, a CPU 241 comprehensively controls access with various devices connected to a system bus 245 based on a control program stored in a ROM 242 or an HDD 244. The ROM 242 stores control programs and the like that the CPU 241 can execute. A RAM 243 mainly functions as a main memory, a work area, or the like, of the CPU 241, and is configured such that a memory capacity can be extended by an option RAM connected to an expansion port (not shown). The HDD 244 stores a boot program, various applications, font data, user files, and edit files. Note, an SD card, a flash memory, and the like may be used as an external storage device in addition to the HDD 244. A network I/F 246 is connected to an external network via a network cable and performs data communication with an external apparatus via the external network. Note, in the present embodiment, the network I/F 246 is connected to the network 106.

<Flow of Operation of Remote Support System>

Description is given regarding a flow of the operation of the whole the remote support system according to the embodiment. In the remote support system, the MFP 101, the operator PC 102, and the relay server 103 are operated hereinafter in order of (1) through (4) respectively.

(1) The MFP 101 accesses (connects to) the relay server 103 and enters a state in which it awaits remote maintenance (remote support).

(2) The operator PC 102 accesses (connects to) the relay server 103 and starts the remote maintenance.

(3) When the MFP 101 restarts, it again accesses (reconnects to) the relay server 103 and enters a state in which it awaits the remote maintenance.

(4) The operator PC 102 extends the remote maintenance and resumes the remote maintenance for the MFP 101.

Hereinafter, a detailed description is given regarding processing executed in the MFP 101, the operator PC 102, and the relay server 103 with reference to FIG. 3 through FIG. 7.

<Processing of MFP 101>

Firstly, description is given regarding the procedure of specific processing executed in the MFP 101 with reference to FIG. 3. The processing of each step illustrated in FIG. 3 is realized in the MFP 101 by the CPU 202 reading a program stored in the HDD 205 to the RAM 204 and executing it.

Firstly, the MFP 101 accepts a pressing of a start button for remote maintenance from the user in step S301. When the start button is pressed, the MFP 101 obtains a login URL of the relay server 103 in step S302. The login URL may be registered in advance to the MFP 101 and may be obtained from an external information processing apparatus.

Next, the MFP 101 transmits a POST request that includes an account name and authentication information as parameters to the login URL in step S303. Here, the authentication information is a password or a certificate for example. The account name and the authentication information are registered in advance to the MFP 101. The relay server 103 performs an authentication (login processing) based on the account name and the authentication information included in the POST request from the MFP 101 and returns a response to the POST request. The MFP 101 determines whether or not a success response indicating that the login processing succeeded is received from the relay server 103 in step S304. The MFP 101 advances the processing to step S305 in a case when the success response is received and returns the processing to step S301 in a case when the success response is not received (an error response indicating that the login processing has failed is received).

In a case when the success response is received, the MFP 101 obtains, from the response received from the relay server 103, an authentication session ID, a support room ID, a URL for entry/exit to a support room, and a logout URL included in the response in step S305. The authentication session ID is a random character sequence that indicates that the authentication based on the account name and the authentication information succeeded. In the present embodiment, the support room corresponds to a virtual space on the relay server which is used in a relay of communication for the remote maintenance (remote support) between the MFP 101 and the operator PC 102. The support room corresponds to a memory region on the relay server. In the present embodiment, the relay server manages a plurality of support rooms (memory regions). As described later with reference to FIG. 7, the relay server 103 manages the plurality of support rooms that can be assigned to the MFP 101 and the operator PC 102 respectively. The support room ID is identification information (ID) indicating such a support room.

Next, in step S306, the MFP 101 transmits, to the URL for entry/exit, the POST request which includes the authentication session ID and the support room ID as the parameters and in which "entry" is designated as a parameter. The POST request corresponds to an entry request to the relay server 103 (requesting entry to a support room that corresponds to the support room ID). When a response to the POST request is received from the relay server 103, the MFP 101 determines whether or not a success response indicating that entry to the support room corresponding to the transmitted support room ID succeeded is received in step S307. The MFP 101 advances the processing to step S308 in a case when the success response is received and advances the processing to step S313 in a case when an error response is received. In step S313, the MFP 101 transmits a POST request that includes the authentication session ID as a parameter to the logout URL, and after this returns the processing to step S301.

In a case when the success response is received, the MFP 101 obtains, from the response received from the relay server 103, an entry session ID, a query code, and a URL for support included in the response in step S308. The entry session ID is a random character sequence indicating that entry to the support room on the relay server 103 succeeded. The query code is a character sequence or a number sequence temporarily attached to a support room that the MFP 101 entered and is one example of a code indicating a support room that the MFP 101 should use for undergoing remote maintenance (remote support). In the relay server 103, it is possible that the support room ID indicating the support room that the MFP 101 entered is identified from the query code.

Next, the MFP 101 displays the query code obtained in step S308 on the operation panel 212 in step S309. The user of the MFP 101 conveys the query code displayed on the operation panel 212 to the operator of the call-center (operator operating the operator PC 102) by a means such as a telephone call or an email. The operator of the operator PC 102 uses the query code conveyed from the user of the MFP 101 to perform an operation for connecting the operator PC 102 to the relay server 103. By this, the MFP 101 and the operator PC 102 enter the same support room on the relay server 103. As a result, remote maintenance of the MFP 101 by the operator PC 102 is possible via the entered support room.

In this way, the MFP 101 can determine whether or not the MFP 101 is to be powered off (restarted) in step S310, after the remote maintenance is started. Note, a restart instruction is performed to the MFP 101 by the user turning off a power supply switch of the MFP 101 in a case when maintenance work is performed while the user is operating the MFP 101. Meanwhile, the restart instruction is made to the MFP 101 by the operator PC 102 in a case when the maintenance work is performed while the operator PC 102 is remotely operating the MFP 101. The MFP 101 advances the processing to step S312 in a case when the MFP 101 is powered off and advances the processing to step S311 in a case when it is not powered off.

The MFP 101 repeats the processing of step S311 as long as a restart of the MFP 101 is not performed (as long as "NO" is determined in step S310). In step S311, the MFP 101 transmits a POST request or a GET request that includes an entry session ID as a parameter to the URL for support. By this, the MFP 101 performs transmission/reception of data for support to/from the relay server 103 via the entered support room (specifically, performs transmission/reception of data for support to/from the operator PC 102 via the relay server 103). Here, the data for support is data of a VNC (Virtual Network Computing) protocol which is a protocol for audio data, video data, or a remote operation for example. It becomes possible for the MFP 101 to undergo support (remote support) by audio, moving image communication, or a remote operation from the operator PC 102 by transmission/reception of such data for support, and maintenance work (remote maintenance) of the MFP 101 by remote support becomes possible.

Next, in a case when the MFP 101 restarts (a case when "YES" is determined in step S310), the MFP 101 transmits, to the URL for entry/exit, a POST request which includes an entry session ID as a parameter and in which "exit" is designated as a parameter in step S312. The POST request corresponds to an exit request to the relay server 103 (requesting exit from a support room that has been entered). After this, in step S313, the MFP 101 transmits a POST request that includes the authentication session ID as a parameter to the logout URL, restarts the MFP 101, and returns the processing to step S301. Note, a connection (session) established between the MFP 101 and the relay server 103 is temporarily disconnected when the MFP 101 is restarted.

The MFP 101 performs a reconnection to the relay server 103 when a start instruction of the remote maintenance is accepted (step S301) from the user in a case when the remote maintenance by the operator PC 102 continues after the MFP 101 restarts (step S302 through step S309). By this, a new connection (session) between the MFP 101 and the relay server 103 is established. In the present embodiment, continuation of the remote maintenance becomes possible without the user of the MFP 101 again conveying a query code to the operator of the operator PC 102 in a case when an extension of the remote maintenance is requested to the relay server 103 from the operator PC 102 as later described.

<Processing of Operator PC 102>

Figure 4A:
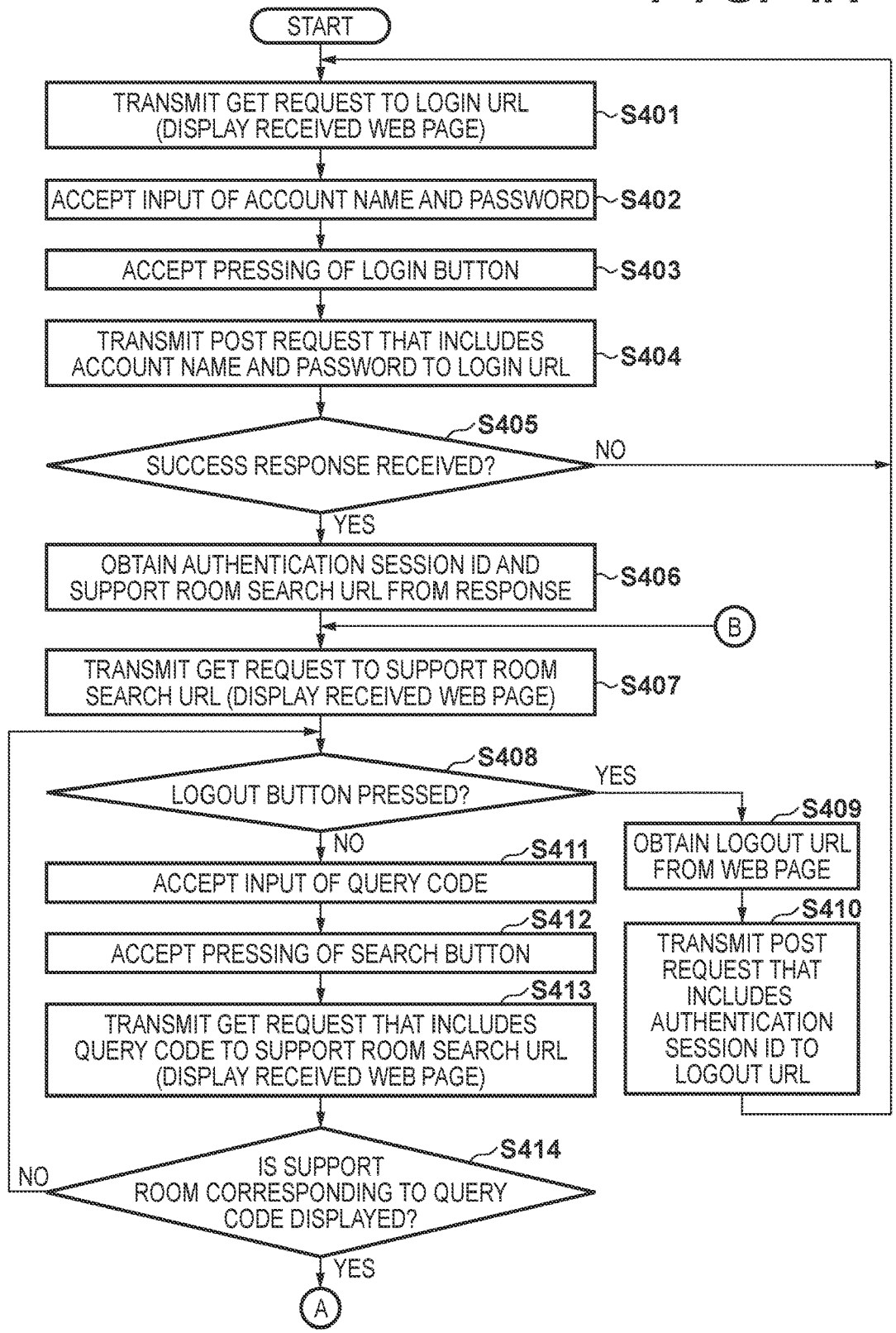
FIG. 4A is a flowchart illustrating a procedure of processing of an operator PC.

Next, description is given regarding the procedure of specific processing executed in the operator PC 102 with reference to FIG. 4A and FIG. 4B. The processing of each step illustrated in FIG. 4A and FIG. 4B is realized in the operator PC 102 by the CPU 221 reading a program stored in the HDD 224 to the RAM 223 and executing it.

Firstly, by transmitting a GET request to the login URL of the relay server 103, the operator PC 102 receives a Web page of the URL from the relay server 103 and displays it on the display 232 in step S401. Note, the display of a screen in the operator PC 102 is performed by a Web browser operated on the operator PC 102. The login URL may be designated by a direct input to an address field of a Web browser screen displayed on the display 232 or may be designated by using a bookmark or the like.

Next, in step S402, the operator PC 102 accepts an input of an account name and a password (authentication information) on the Web page displayed in step S401. Furthermore, in step S403, the operator PC 102 accepts a pressing of a login button on the Web page displayed in step S401. When the login button is pressed, the operator PC 102 transmits a POST request that includes the account name and the password as parameters to the login URL in step S404. The relay server 103 performs an authentication (login processing) based on the account name and the password included in the POST request from the operator PC 102 and returns a response to the POST request. The operator PC 102 determines whether or not a success response indicating that the login processing succeeded is received from the relay server 103 in step S405. The operator PC 102 advances the processing to step S406 in a case when the success response is received and returns the processing to step S401 in a case when the success response is not received (an error response indicating that the login processing has failed is received).

In a case when the success response is received, the operator PC 102 obtains the authentication session ID and the support room search URL included in the response received from the relay server 103 in step S406. Next, in step S407, the operator PC 102 receives the Web page of the URL from the relay server 103 by transmitting a GET request that includes the authentication session ID as a parameter to the support room search URL, and displays it on the display 232. The Web page is a page for the operator of the operator PC 102 to search for an identified support room from among a plurality of support rooms existing on the relay server 103.

Figures 6, 7:
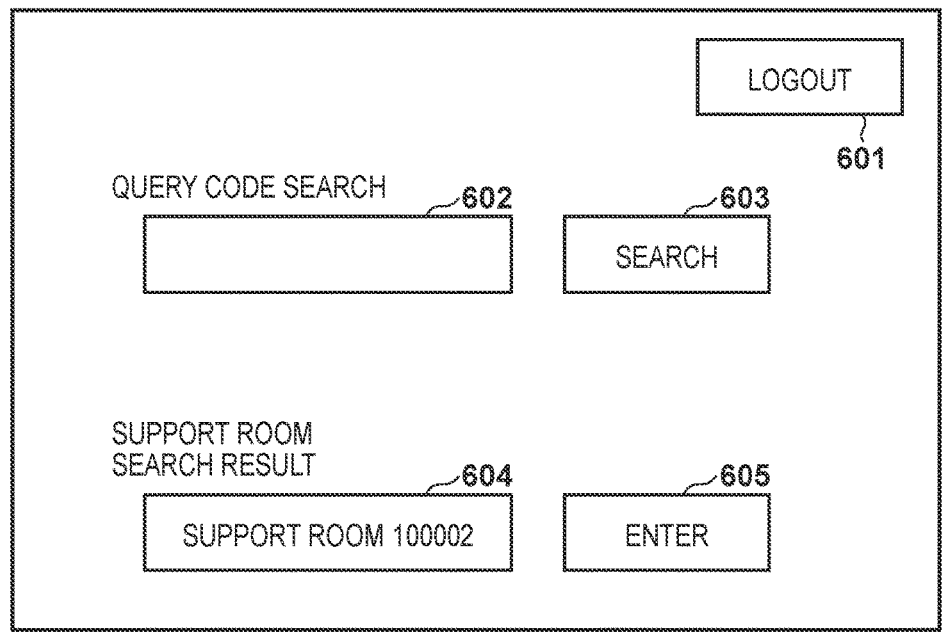
FIG. 6 illustrates one example of a Web page for searching for a support room in the relay server.
FIG. 7 illustrates one example of a support room list managed by the relay server.

Here, FIG. 6 illustrates one example of the Web page for searching for a support room that is displayed on the display 232 of the operator PC 102. In the Web page illustrated in FIG. 6, a logout button 601 is a button for making an instruction for an execution of a logout from an account that is logged in. A field 602 is a field for inputting a query code. A search button 603 is a button for making an instruction to execute a search for a support room by the query code inputted in the field 602. The result of the processing executed in response to pressing the search button 603 is displayed in a region 604. FIG. 6 illustrates an example in which the result of processing is displayed and an ID ("100002") of the found support room is displayed. In a case when a support room ID is displayed in the region 604, a region 605 functions as an entry button for making an instruction to enter into the support room that the support room ID indicates. Note, nothing is displayed in the region 605 and the region 605 does not function as an entry button, in a case when a support room ID is not displayed in the region 604.

The operator PC 102 determines whether or not a pressing of the logout button 601 is accepted in step S408 after a display of the Web page in step S407 is started. The operator PC 102 advances the processing to step S409 in a case when a pressing of the logout button 601 is accepted and obtains a URL for logout from the response (Web page) received in step S407. After this, in step S410, the operator PC 102 logs out from the relay server 103 by transmitting a POST request that includes the authentication session ID to the obtained logout URL and returns the processing to step S401.

Meanwhile, the operator PC 102 advances the processing to step S411 in a case when a pressing of the logout button 601 is not accepted in step S408. In step S411 through step S417, the operator PC 102 uses the query code conveyed from the user of the MFP 101 to the operator of the operator PC 102 and performs processing for making a request for a start of remote support.

In step S411, the operator PC 102 accepts an inputting of the query code. Specifically, it accepts an inputting of the query code to the field 602 in the Web page illustrated in FIG. 6. After this, the operator PC 102 accepts a pressing of the search button 603 in the Web page illustrated in FIG. 6 in step S412. Next, in step S413, the operator PC 102 transmits a GET request that includes the query code as a parameter (specifically, a GET request for a "search") to the support room search URL when it accepts a pressing of the search button 603. By this, the operator PC 102 displays the Web page received from the relay server 103 as a response to the GET request to the display 232.

Next, in step S414, the operator PC 102 determines whether or not the support room (specifically, a result of a search) corresponding to the query code transmitted to the relay server 103 in step S413 is displayed in the Web page. This determination corresponds to the determination of whether or not the support room (support room ID) corresponding to the transmitted query code is acquired as a result of a search by the relay server 103. In a case when such search result is obtained, the ID of the found support room is displayed in the region 604 and the state becomes such that "enter" is displayed in the region 605 as illustrated in FIG. 6. In step S414, the operator PC 102 returns the processing to step S408 in a case when the search result is not displayed and advances the processing to step S415 in a case when the search result is displayed.

In step S415, the operator PC 102 accepts a pressing of the entry button (region 605 of FIG. 6). When a pressing of the entry button is accepted, the operator PC 102 in step S413 obtains the URL for entry/exit and the support room ID from the response (Web page) received in step S416. Next, in step S417, the operator PC 102 transmits, to the URL for entry/exit, a POST request which includes the authentication session ID and the support room ID as the parameters and in which "entry" is designated as a parameter. The POST request corresponds to an entry request to the relay server 103 (requesting entry to a support room that corresponds to the support room ID). When a response to the POST request is received from the relay server 103, it is determined whether or not a success response indicating that entry to the support room corresponding to the transmitted support room ID succeeded is received in step S418. The operator PC 102 advances the processing to step S419 in a case when the success response is received and returns the processing to step S407 in a case when an error response is received.

In a case when the success response is received, in step S419, the operator PC 102 obtains, from the response received from the relay server 103, the entry session ID and the URL for support included in the response. By this, the operator PC 102 is enabled to transmit/receive data for support to/from the MFP 101 via the entered support room (via the relay server 103), and maintenance work (remote maintenance) of the MFP 101 by remote support becomes possible.

After this, the operator PC 102 determines whether or not a pressing of a stop button is accepted in step S420 and further determines whether or not a pressing of an extend button is accepted in step S422 in a case when a pressing of the stop button is not accepted. Here, the stop button is a button for the operator to make an instruction for a stopping the remote support. The extend button is a button for the operator to make an instruction to request an extension of the remote support for the MFP 101 to the relay server 103 after a reconnection is performed to the relay server 103 by the MFP 101. The stop button and the extend button are both displayed on a Web browser screen (operation screen). If, in step S422, a pressing of the extend button is not accepted, the operator PC 102 advances the processing to step S428. In step S428, the operator PC 102 transmits a POST request or a GET request that includes an entry session ID as a parameter to the URL for support. By this, the operator PC 102 performs transmission/reception of data for support to/from the MFP 101 via the entered support room (via the relay server 103).

In this way, the operator PC 102 continues the processing of step S428 so long as neither the stop button nor the extend button are pressed. Meanwhile, the operator PC 102 advances the processing to step S421 in a case when a pressing of the stop button is accepted in step S420. In step S421, the operator PC 102 transmits, to the URL for entry/exit, a POST request which includes the entry session ID as a parameter and in which "exit" is designated as a parameter. The POST request corresponds to an exit request to the relay server 103 (requesting exit from a support room that has been entered). After this, the operator PC 102 returns the processing to step S407.

Meanwhile, the operator PC 102 advances the processing to step S423 in a case when a pressing of the extend button is accepted in step S422. In step S423, the operator PC 102 transmits, to the URL for entry/exit, a POST request which includes the entry session ID as a parameter and in which "support extension" is designated as a parameter. The POST request corresponds to an extension request to the relay server 103 and is to request an extension of remote support for the MFP in a case when the support target MFP 101 restarts. Next, in step S424, the operator PC 102 determines whether or not a success response indicating that the remote support extension succeeded is received from the relay server 103. As a result of the determination, in a case when the operator PC 102 received the success response, it advances the processing to step S425, and in a case when it receives an error response, it returns the processing to step S420.

In a case when the success response is received in step S424, the operator PC 102 obtains a new support room ID included in the response received from the relay server 103 in step S425. The new support room ID is a support room ID corresponding to a new support room that the support target MFP 101 enters after a restart. After that, in step S426, the operator PC 102 transmits, to the URL for entry/exit, a POST request which includes the entry session ID as a parameter and in which "exit" is designated as a parameter. By this, the operator PC 102 makes a request to exit the support room that the support target MFP 101 has already exited to the relay server 103.

Next, in step S427, the operator PC 102 transmits, to the URL for entry/exit, a POST request which includes an authentication session ID and the new support room ID obtained in step S425 as parameters and in which "entry" is designated as a parameter. By this, the operator PC 102 makes, to the relay server 103, a request to enter the support room that the support target MFP 101 has newly entered after a restart. After this, the operator PC 102 returns the processing to step S418.

By virtue of the sequence of the processing of step S422 through step S427, just by the operator of the operator PC 102 pressing the extend button, the operator PC 102 can automatically enter a new support room. The support room ID for the new support room corresponds to the new support room that the MFP 101 entered after a restart and this is notified to the operator PC 102 from the relay server 103 by the response in step S424. Note, description is given later regarding a notification of a support room ID to the operator PC 102 from the relay server 103 with reference to FIG. 5A through FIG. 5C. In this way, for the operator PC 102, the operator is enabled to enter the support room that the MFP 101 entered after a restart just by pressing the extend button without it being necessary to acquire a query code from the user of the MFP 101 and input the acquired query code to the system.

<Processing of Relay Server 103>

The relay server 103 manages a plurality of support rooms that can be used for a relay of communication for remote support between the MFP 101 and the operator PC 102 as illustrated in FIG. 7. The relay server 103 assigns an empty support room from among a plurality of support rooms to the MFP 101 as a support room which should be used for undergoing remote support each time a connection from the MFP 101 is made. In the present embodiment, in a case when an extension of remote support (remote maintenance) becomes necessary at a time of a restart of the MFP 101, the relay server 103 performs the following processing in order to realize a resumption (extension) of the remote support interrupted by the restart by a simpler procedure.

Specifically, the relay server 103 associates an account (identification information) of the MFP 101 with an account (identification information) of the operator PC 102 when remote support by the operator PC 102 is started by using a support room assigned to the MFP 101. After this, when an extension of the remote support is requested from the operator PC 102 after a reconnection by the MFP 101 is performed (step S423), the relay server 103 identifies the support room newly assigned by the reconnection to the MFP 101 that is a target of the remote support.

The identification of the foregoing support room is performed based on the account of the MFP 101 associated with the account of the operator PC 102. In the present embodiment, the relay server 103 holds, as a support room list (FIG. 7), management information that includes a plurality of pieces of identification information (accounts) respectively being used. The relay server 103 can identify a support room that the MFP 101 is using, by searching for the account of the MFP 101 associated with the account of the operator PC 102 in the support room list.

When a support room newly assigned to the MFP 101 (specifically, a support room that the MFP is using) is identified, the relay server 103 transmits the support room ID corresponding to the support room to the operator PC 102 as information for using the identified support room. As a result, the operator PC 102 is enabled to enter a support room that the MFP 101 entered (is using) based on the support room ID received from the relay server 103 by the processing of step S424 through step S427.

Figure 5B:
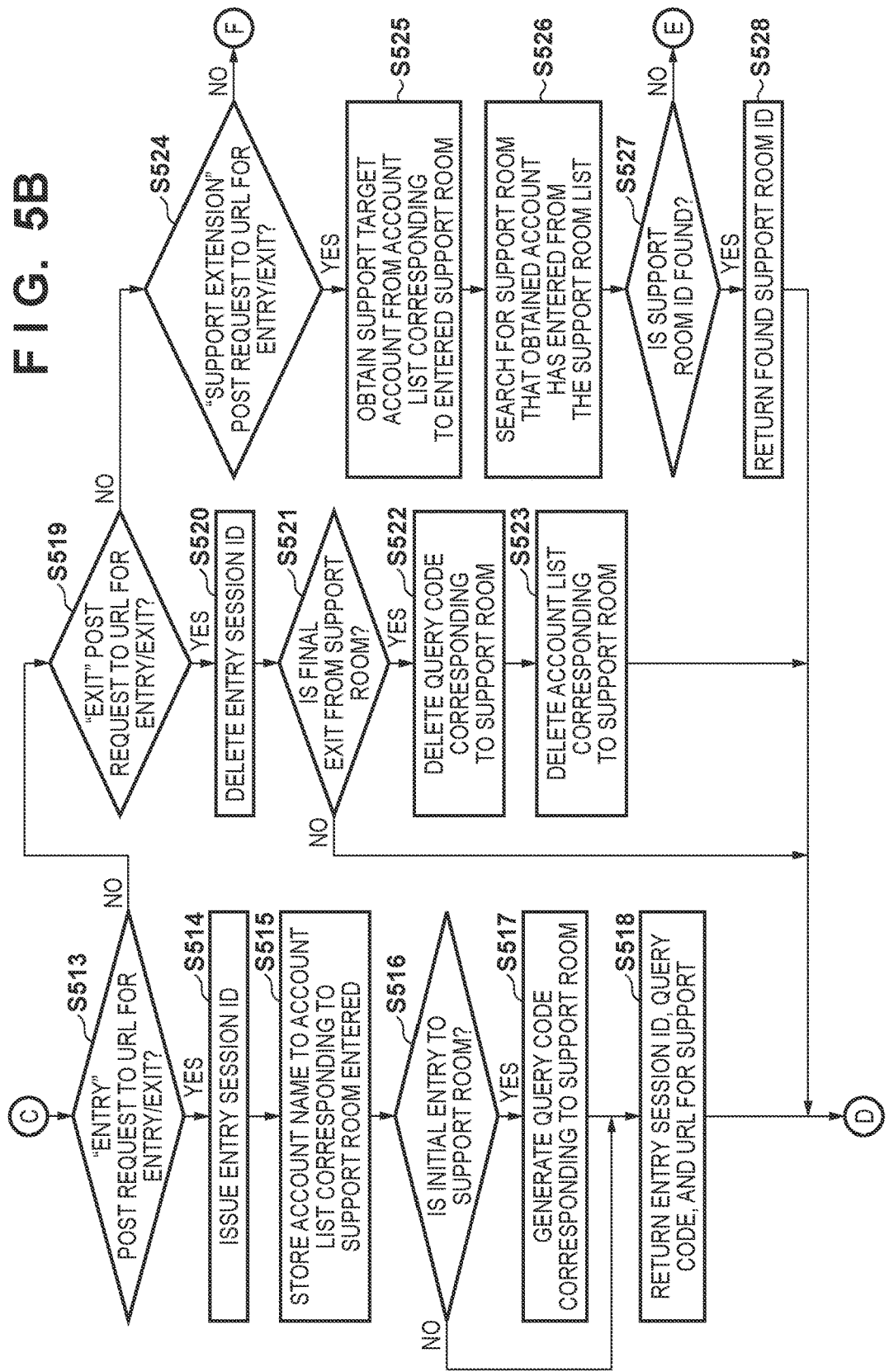
FIG. 5B is a flowchart illustrating a procedure of processing of a relay server (first embodiment).
Figure 5C:
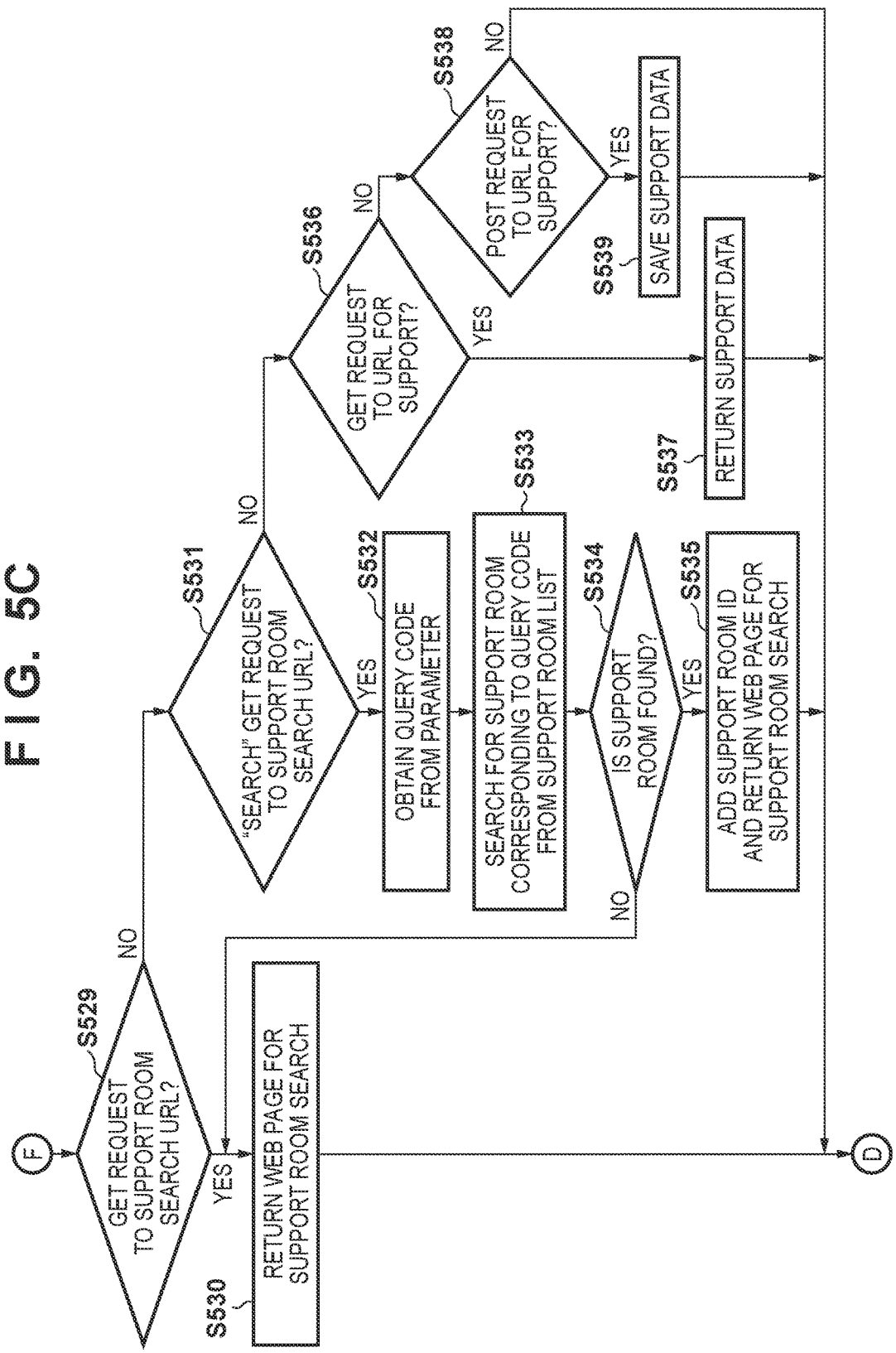
FIG. 5C is a flowchart illustrating a procedure of processing of a relay server (first embodiment).

Below, description is given regarding the procedure of specific processing executed in the relay server 103 with reference to FIG. 5A to FIG. 5C. The processing of each step illustrated in FIG. 5A to FIG. 5C is realized in the relay server 103 by the CPU 241 reading a program stored in the HDD 244 to the RAM 243 and executing it.

Firstly, the relay server 103 receives data from the operator PC 102 or the MFP 101 which is the client (HTTP client) in step S500. When the data is received, the relay server 103 determines whether or not a request is received from the client in step S501, step S507, step S511, step S513, step S519, step S524, step S529, step S531, step S536, and step S538, and executes the processing in accordance with the determination result. If a request received from the client is not a processing target request ("NO" in step S538), the relay server 103 returns the processing to step S500 and receives subsequent data.

(A POST Request to Login URL for MFP)

In a case when the relay server 103 receives a POST request to the login URL for MFP ("YES" in step S501), it performs, in step S502, login processing for an account which an account name included in the received POST request indicates. The login URL for MFP is a URL prepared in order to accept a login request from the MFP 101 and, specifically, a POST request to the login URL the MFP corresponds to a login request from the MFP 101. Although details are omitted, login processing corresponds to processing such as a verification of a password or a verification of a token of a certificate. When the login processing succeeds, the relay server 103 issues an authentication session ID comprising a random character sequence to a login target account. A client knowing the authentication session ID is certification that the client is an authenticated client.

Next, in step S503, the relay server 103 determines whether or not the login processing of step S502 succeeds, returns an error response to the client (MFP 101) in step S540 and returns the processing to step S500 in a case when the login processing fails. In a case when the login processing succeeds, the relay server 103 searches for an empty room from the support room list in step S504. FIG. 7 illustrates one example of a support room list managed by the relay server 103. The relay server 103 manages information (management information) relating to a plurality of support rooms existing on the server in in a state of being saved in the RAM 243 or the HDD 244 as a support room list. A plurality of support room IDs corresponding to a plurality of support rooms respectively existing on the relay server 103 are held in the support room list as illustrated in FIG. 7. Query codes, entry session IDs, and account lists associated with each support room ID are further held in the support room list. A support room ID in which a query code and an entry session ID are not associated/held indicates a support room that is in an empty room state such as the support room ID "100001" illustrated in FIG. 7.

In step S505, the relay server 103 determines whether or not an empty room (support room ID "100001" of FIG. 7 for example) is found in the support room list. The relay server 103 returns an error response to the client (MFP 101) in step S540 and returns the processing to step S500 in a case when an empty room could not be found, and in a case when an empty room is found, advances the processing to step S506. In step S506, the relay server 103 returns a response (success response) that includes the authentication session ID, the support room ID, the URL for entry/exit, and the logout URL to the client. The support room ID is the support room ID discovered in step S504, and the URL for entry/exit and the logout URL are URLs that are set in advance in the relay server 103.

In this way, in step S504 through step S506, the relay server 103 assigns an empty support room to the MFP 101 by transmitting a support room ID corresponding to the empty support room to the MFP 101 each time a connection is made from the MFP 101. Also, the relay server 103 newly assigns an empty support room to the MFP 101 by transmitting a support room ID corresponding to the empty support room to the MFP 101 in a case when a disconnection and a reconnection of a connection with the MFP 101 are made by a restart of the MFP 101. When the processing of step S506 completes, the relay server 103 returns the processing to step S500.

(A POST Request to Login URL for PC)

In a case when the relay server 103 receives a POST request to the login URL for PC ("YES" in step S507), it performs, in step S508, login processing for an account which an account name included in the received POST request indicates. The login URL for PC is a URL prepared in order to accept a login request from the operator PC 102 and, specifically, a POST request to the login URL for PC corresponds to a login request from the operator PC 102. Note, details of the login processing are the same as step S502.

Next, in step S509, the relay server 103 determines whether or not the login processing of step S508 succeeds, returns an error response to the client (the operator PC 102) in step S540, and returns the processing to step S500 in a case when the login processing fails. In a case when the login processing succeeds, the relay server 103 returns a response (success response) that includes an authentication session ID and a support room search URL to the client in step S510. The support room search URL is a URL set in advance in the relay server 103. When the processing of step S510 completes, the relay server 103 returns the processing to step S500.

(A POST Request to Logout URL)

The relay server 103 performs, in step S512, logout processing from an account logged in in a case when it receives a POST request to the logout URL ("YES" in step S511). Specifically, the relay server 103 performs the logout processing by discarding the authentication session ID that includes the received POST request. When the logout processing completes, the relay server 103 returns the processing to step S500.

("Entry" POST Request to URL for Entry/Exit)

The relay server 103 issues an entry session ID in step S514 in a case when it receives an "entry" POST request to the URL for entry/exit (specifically, a POST request in which "entry" is designated as a parameter) ("YES" in step S513). The POST request includes an authentication session ID and a support room ID, and corresponds to an entry request in which entry to a support room corresponding to the support room ID is requested as described above. The relay server 103 associates the issued entry session ID with the support room ID included in the POST request and adds it to the support room list.

Next, in step S515, the relay server 103 adds an account name of the transmission source of the POST request to an account list corresponding to the entered support room (specifically, corresponding to the support room ID included in the POST request) within the support room list. The account name can be searched for based on information of the authentication session ID included in the POST request. An account added to the account list corresponding to the same support room ID enters a state in which they can be associated with each other. Accordingly, the processing of step S515 corresponds to processing for associating an account (identification information) of the operator PC 102 with an account of the MFP 101 when remote maintenance (remote support) for the MFP 101 is started by the operator PC 102. Note, the account and the entry session ID respectively added in the support room list in step S514 and step S515 are held within the support room list in which they are associated with each other as illustrated in FIG. 7. For this reason, it is possible to identify an account name associated with an entry session ID when referencing the support room list.

Next, in step S516, the relay server 103 determines whether or not the entry target support room according to the POST request is an empty room (specifically, an initial entry to the entry target support room). The relay server 103 advances the processing to step S517 in a case when the entry target support room is an empty room, and advances the processing to step S518 in a case when the entry target support room is not an empty room. In step S517, the relay server 103 generates a query code corresponding to the entry target support room. The query code is a character sequence or a number sequence randomly generated for example. In a case when entering a support room that is an empty room, an entry session ID and account list pair is saved in association with a support room ID as with the information associated with the support room ID "100002" illustrated in FIG. 7 in the support room list. Meanwhile, in a case when entering a support room that is not an empty room, a plurality of entry session ID and account list pairs are saved in association with a support room ID as with the information associated with the support room ID "100003" illustrated in FIG. 7 in the support room list.

Finally, in step S518, the relay server 103 returns a response (success response) that includes the entry session ID, the query code, and the URL for support to the client. The URL for support is a URL set in advance in the relay server 103. In this way, in step S517 and step S518, the relay server 103 transmits, to the MFP 101, a query code indicating a support room that should be used each time a connection is made from the MFP 101. When the processing of step S518 completes, the relay server 103 returns the processing to step S500.

("Exit" POST Request to URL for Entry/Exit)

The relay server 103 deletes an entry session ID in step S520 in a case when it receives an "exit" POST request to the URL for entry/exit (specifically, a POST request in which "exit" is designated as a parameter) ("YES" in step S519). The POST request includes an entry session ID and corresponds to an exit request for requesting exit from the entered support room corresponding to the entry session ID, as described above. In step S520, the relay server 103 searches for an entry session ID included in the received POST request within the support room list and deletes it from the support room list. By this, the client that is the transmission source of the POST request (the MFP 101 or the operator PC 102) exits from the entered support room and, as a result, the connection between the client and the relay server 103 is disconnected.

For example, in a case in which the MFP 101 exited in a state in which the MFP 101 and the operator PC 102 entered the support room of ID "100004", it is as with the information associated with the support room ID "100004" illustrated in FIG. 7. Specifically, only an entry session ID corresponding to the MFP 101 that exited is deleted from the support room list and an account name associated to the deletion target entry session ID is not deleted from the account list.

Next, in step S521, the relay server 103 determines whether or not a client remains in the exit target support room according to the POST request (specifically, a final exit from the exit target support room). Specifically, as a result of the relay server 103 deleting the entry session ID associated with the identified support room ID within the support room list in step S520, it is determined whether or not another entry session ID associated with that identified support room ID remains. In a case when a client remains in the exit target support room, the relay server 103 returns the processing to step S500, and in a case no client remains, the relay server 103 advances the processing to step S522.

In step S522, the relay server 103 deletes the query code associated with the exit target support room ID from the support room list. Furthermore, in step S523, the relay server 103 deletes from the support room list the account included in the account list associated with the exit target support room ID. In this way, when a connection between the operator PC 102 and the relay server 103 and a connection between the MFP 101 and the relay server 103 are both disconnected, an association between the account of the operator PC 102 and the account of the MFP 101 is released. When the processing of step S522 and step S523 completes, the relay server 103 returns the processing to step S500.

("Support Extension" POST Request to URL for Entry/Exit)

The relay server 103 identifies an account that is the target of support extension in step S525 in a case when it receives an "support extension" POST request to the URL for entry/exit (specifically, a POST request in which "support extension" is designated as a parameter) ("YES" in step S519). Note, the POST request includes an entry session ID and corresponds to an extension request for requesting an extension of remote support for the MFP in a case when the support target MFP 101 restarts. Specifically, in step S525, the relay server 103 identifies a support room ID corresponding to an entry session ID included the received POST request and identifies an account that is the target of a support extension from an account list corresponding to the support room ID. Specifically, the relay server 103 obtains the account name corresponding to the entry session ID previously deleted in step S520 from the account list corresponding to the support room ID. The account name obtained in step S525 is an account name indicating an account of the client (MFP 101) for which the client (the operator PC 102) which is the transmission source of the POST request was performing maintenance work (remote maintenance) by remote support until immediately prior. The account of the MFP 101 associated with the account of the operator PC 102 is identified by this kind of processing.

Next, in step S526, the relay server 103 searches for a support room (support room ID) that the account obtained in step S525 has entered from the support room list. Specifically, the relay server 103 searches for the obtained account name from among account names held in a state of being associated with the entry session ID within the support room list and identifies the support room ID associated with the found account name. In this way, the processing of step S526 corresponds to processing for identifying a support room newly assigned by a reconnection to the MFP 101 that is a target of remote support, based on the account of the MFP 101 associated with the account of the operator PC 102. The processing is performed without the need of a query code indicating the support room newly assigned by a reconnection to the MFP 101.

The relay server 103 returns an error response to the client (MFP 101) in step S540 and returns the processing to step S500 in a case when the result of a determination of whether or not the support room ID can be found is that it could not be found in step S527. In a case when the support room ID can be found, the relay server 103 advances the processing to step S528 and returns a response (success response) that includes the found support room ID to the client (operator PC 102). In this way, the processing of step S528 corresponds to processing for transmitting a support room ID to the operator PC 102 as information for using the support room identified in step S526. After this, the relay server 103 returns the processing to step S500.

By the processing of step S524 through step S528 by the relay server 103, the operator PC 102 is enabled to obtain a new support room ID corresponding to a support room that should be entered next in a case when an extension of remote support for the MFP 101 is necessary (step S422 through step S425). For example, in the example of FIG. 7, a case in which the operator PC 102 (account name: User05) performs remote maintenance of the MFP 101 (account name: Mfp03) via the support room whose ID is "100004" is assumed. In such a case, when the MFP 101 exits from the support room in order to restart, a state is entered in which the entry session ID corresponding to the MFP 101 and associated with the support room ID "100004" is deleted as illustrated in FIG. 7. After this, when the MFP 101 enters the support room whose ID is "100002" after the restart, the account corresponding to the MFP 101 and the entry session ID, are added to the support room list in association with the support room ID "100002" as illustrated in FIG. 7. When the operator PC 102 performs an extension request in this state, the ID "100002" of the support room that the MFP 101 newly entered is searched for and is transmitted to the operator PC 102 by the relay server 103. As a result, the operator PC 102 can obtain the new support room ID "100002" corresponding to the support room that should be entered next.

(GET Request to Support Room Search URL)

The relay server 103 returns a Web page for a support room search to the client (operator PC 102) in step S530 in a case when a GET request that does not include a query code to the support room search URL is received ("YES" in step S529). Note, although a URL for entry/exit and a logout URL may be included in this Web page, the result of the support room search (support room ID) is not added. For this reason, the screen illustrated in FIG. 6 is displayed in a state in which nothing is displayed in the regions 604 and 605 when the Web page is displayed in the operator PC 102. The relay server 103 returns the processing to step S500 when the processing of step S530 completes.

("Search" GET Request to URL for Support Room Search)

The relay server 103 obtains a query code from a parameter included in the GET request received in step S532 in a case of a GET request (specifically, a "search" GET request) that includes a query code to the URL for support room search ("YES" in step S531). After this, the relay server 103 searches for the support room (support room ID) corresponding to the obtained query code from the support room list in step S533 and determines whether or not the support room ID corresponding to the query code is searched for (discovered) in step S534.

The relay server 103 advances the processing to step S530 in a case when the support room ID is not found, and returns a Web page for a support room search to the client (operator PC 102) to which no support room ID is added. Meanwhile, the relay server 103 advances the processing to step S535 in a case when the support room ID is found, adds the found support room ID to the Web page, and returns it to the client (operator PC 102). When the Web page to which the support room ID is added is displayed in the operator PC 102, the ID of the found support room is displayed in the region 604 and a screen of a state in which "enter" is displayed in the region 605 becomes displayed as illustrated in FIG. 6. The relay server 103 returns the processing to step S500 when the processing of step S535 completes.

(GET Request and POST Request to URL for Support)

The relay server 103, in a case when it receives a GET request to a URL for support ("YES" in step S536), obtains data of the support room (data for support) corresponding to the entry session ID included in the received GET request and returns it to the client in step S537. As described above, the client is the MFP 101 or the operator PC 102. Specifically, the relay server 103 returns data saved in a data buffer relating to the support room to the client.

Meanwhile, in a case when the relay server 103 receives a POST request to the URL for support ("YES" in step S538), it saves, in step S539, data (data for support) included in the received POST request. Specifically, the relay server 103 saves data included in the POST request to the data buffer relating to the support room as data of the support room corresponding to the entry session ID included in the POST request.

By the processing of step S536 through step S539, a relay of communication for remote support is performed between the operator PC 102 and the MFP 101 via the support room that the operator PC 102 and the MFP 101 are using. Specifically, data transmitted/received for remote support between the operator PC 102 and the MFP 101 is relayed via the data buffer corresponding to the support room that the operator PC 102 and the MFP 101 are using. By this, remote maintenance (remote support) is realized by a remote operation by audio, moving image communication, or a VNC protocol. When the processing of step S537 or step S539 completes, the relay server 103 returns the processing to step S500.

By virtue of the present embodiment, an operator of a call-center can cause the operator PC 102 to re-enter a support room that the MFP 101 newly entered after a restart simply by pressing the extend button displayed on the display 232 of the operator PC 102. As a result, the remote support interrupted by the restart of the MFP 101 can be resumed. Such a resumption of remote support is performed without the operator of the call-center needing to elicit, from a user of the MFP 101, a query code corresponding to a support room that the MFP 101 newly entered and re-input it into the system, and so the effort of the operator is reduced. In this way, by virtue of the present embodiment, it is possible to resume the remote support interrupted by the restart of the MFP 101 by a simple procedure.

Second Embodiment

Next, description is given regarding a second embodiment with reference to FIG. 8, FIG. 5B, and FIG. 5C. The network configuration and the hardware configuration and the processing of MFP 101 and the operator PC 102 of the present embodiment are the same as in the first embodiment. Hereinafter, the present embodiment is described focusing on points of difference from the first embodiment.

FIG. 8, FIG. 5B, and FIG. 5C are flowcharts illustrating a procedure of processing executed in the relay server 103 according to the embodiment. The processing of each step illustrated in FIG. 8, FIG. 5B and FIG. 5C is realized in the relay server 103 by the CPU 241 reading a program stored in the HDD 244 to the RAM 243 and executing it. Note, hereinafter, regarding performing processing that is the same as the first embodiment (FIG. 5A through FIG. 5C), the same reference numerals as FIG. 5A through FIG. 5C are given and description is omitted. The present embodiment is different from the first embodiment in that the processing of step S801 and step S802 as illustrated in FIG. 8 is added.

In the present embodiment, the relay server 103 advances the processing from step S503 to step S801 when login processing executed in accordance with a reception of a POST request to a login URL for MFP succeeds ("YES" in step S503). In step S801 and step S802, when a reconnection by the MFP 101 is performed, processing for identifying a support room that the MFP 101 used prior to the reconnection is performed based on an account of the operator PC 102 associated with an account of the MFP 101. Furthermore, in step S506, information (support room ID) for using the support room that is identified in step S801 and step S802 is transmitted to the operator PC 102 in a case when an extension of remote support is requested from the operator PC 102 after the reconnection by the MFP 101 is performed.

Specifically, in step S801, the relay server 103 searches for the account name of the client that is the transmission source of the POST request from the support room list. After this, in step S802, the relay server 103 determines whether or not the account name of the search target could be found (discovered in the support list). The relay server 103 advances the processing to step S504 in a case when it did not discover the account name of the search target, and from there on, executes the same processing as in the first embodiment.

Meanwhile, in a case when the relay server 103 finds the account name of the search target, it obtains the support room ID associated with the found account name (specifically, an ID of a support room that a corresponding account entered previously) and advances the processing to step S506. In such a case, in step S506, the relay server 103 returns a response (success response) that includes the authentication session ID, the URL for entry/exit, the logout URL, and the obtained support room ID to the client and returns the processing to step S500.

By virtue of the processing of step S801 and step S802, while the operator PC 102 performs remote maintenance of the MFP 101 via the identified support room, the MFP 101 exits from the support room for a restart and after that enters the same support room (original support room) again. In such a case, the operator PC 102 may maintain an entry state to the entered support room if an extension of the remote support for the MFP 101 is necessary in order to perform remote maintenance for the MFP 101 after a restart. As a result, the operator PC 102 is enabled to continue remote maintenance of the MFP 101 via the same support room before and after the restart of the MFP 101 because the restarted MFP 101 enters the same support room.

For example, in the example of FIG. 7, a case in which the operator PC 102 (account name: User05) performs remote maintenance of the MFP 101 (account name: Mfp03) via the support room whose ID is "100004" is assumed. In such a case, when the MFP 101 exits from the support room in order to restart, a state is entered in which the entry session ID corresponding to the MFP 101 and associated with the support room ID "100004" is deleted as illustrated in FIG. 7. After this, when a POST request is transmitted to the login URL for MFP after a restart of the MFP 101, the support room of ID "100004" is entered again by the processing of step S801 and step S802.

By virtue of the present embodiment, the operator PC 102 can resume remote support interrupted by a restart of the MFP 101 simply by maintaining an entered state to the entered support room. Accordingly, it is possible to resume the remote support interrupted by the restart of the MFP 101 by a simple procedure.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-087385, filed Apr. 25, 2016, which is hereby incorporated by reference herein in its entirety.

What is claimed is:

1. A relay server that relays communication between at least one image processing apparatus and at least one information processing apparatus that performs remote support for the image processing apparatus, comprising:
   a memory device that stores a set of instructions; and
   at least one processor that executes the instructions to:
   manage a plurality of memory regions on the relay server each of which is used for a relay of communication for the remote support between an image processing apparatus and an information processing apparatus;
   assign, for each connection being made from the image processing apparatus, one of the plurality of memory regions to the image processing apparatus as a memory region to be used for undergoing the remote support;
   associate identification information of the image processing apparatus with identification information of the information processing apparatus in a case where the remote support for the image processing apparatus is started by the information processing apparatus; and
   in a case where a resumption of the remote support is requested from the information processing apparatus after a reconnection by the image processing apparatus is performed, identify a memory region newly assigned, in accordance with the reconnection, to the image processing apparatus that is a target of the remote support, based on the identification information of the image processing apparatus associated with the identification information of the information processing apparatus, and transmit information for using the identified memory region to the information processing apparatus.

2. The relay server according to claim 1, further comprising:
   a storage unit that stores management information that includes identification information of an apparatus currently using each of the plurality of the memory regions,
   wherein the at least one processor executes instructions in the memory to:
   in a case where the resumption of the remote support is requested from the information processing apparatus after a reconnection by the image processing apparatus is performed, identify the memory region that the image processing apparatus is using, by searching in the management information for the identification information of the image processing apparatus associated with the identification information of the information processing apparatus.

3. The relay server according to claim 1,
   wherein the at least one processor executes instructions in the memory to:
   newly assign a memory region that is not used for the remote support from among the plurality of memory regions to the image processing apparatus, in a case where a disconnection of the connection with the image processing apparatus and the reconnection is made due to a restart of the image processing apparatus.

4. The relay server according to claim 1,
   wherein the at least one processor executes instructions in the memory to:
   transmit a code indicating the memory region to be used to the image processing apparatus for each connection being made from the image processing apparatus;
   transmit to the information processing apparatus information for using the memory region that the code indicates, in a case where a start of the remote support is requested by the information processing apparatus by using the code conveyed to an operator of the information processing apparatus from a user of the image processing apparatus; and
   perform an identification of a memory region based on the identification information of the image processing apparatus associated with the identification information of the information processing apparatus without requiring a code indicating the newly assigned memory region in a case where the resumption of the remote support is requested from the information processing apparatus.

5. The relay server according to claim 1,
   wherein the at least one processor executes instructions in the memory to:
   release the association between the identification information of the image processing apparatus and the identification information of the information processing apparatus in a case where the connection between the information processing apparatus and the relay server and the connection between the image processing apparatus and the relay server are both disconnected.

6. The relay server according to claim 1,
   wherein the at least one processor executes instructions in the memory to:
   in a case where the remote support is started, relay communication for the remote support between the image processing apparatus and the information processing apparatus via the memory region being used by the information processing apparatus and the image processing apparatus.

7. The relay server according to claim 1,
   wherein the at least one processor executes instructions in the memory to:
   relay data transmitted/received for the remote support between the information processing apparatus and the image processing apparatus via a data buffer corresponding to the memory region being used by the information processing apparatus and the image processing apparatus.

8. The relay server according to claim 1, wherein the memory region is a support room that is a virtual space on the relay server.

9. A relay server that relays communication between at least one image processing apparatus and at least one information processing apparatus that performs remote support for the image processing apparatus, comprising:
- a memory device that stores a set of instructions; and
- at least one processor that executes the instructions to:
  - manage a plurality of memory regions each of which is used for a relay of communication for the remote support between an image processing apparatus and an information processing apparatus;
  - assign, for each connection being made from the image processing apparatus, one of the plurality of memory regions to the image processing apparatus as a memory region to be used for undergoing the remote support;
  - associate identification information of the image processing apparatus with identification information of the information processing apparatus in a case where the remote support for the image processing apparatus is started by the information processing apparatus; and
  - in a case where a reconnection by the image processing apparatus is performed, identify a memory region that the image processing apparatus was using prior to the reconnection, based on the identification information of the information processing apparatus associated with the identification information of the image processing apparatus, and assign the identified memory region to the image processing apparatus; and
  - in a case where a resumption of the remote support is requested from the information processing apparatus after the reconnection by the image processing apparatus is performed, transmit information for using the identified memory region to the information processing apparatus.

10. A communication system comprising:
- a relay server,
- at least one image processing apparatus, and
- at least one information processing apparatus that performs remote support for the image processing apparatus by communicating with the image processing apparatus via the relay server, wherein
the relay server comprises:
- a memory device that stores a set of instructions; and
- at least one processor that executes the instructions to:
  - manage a plurality of memory regions on the relay server each of which is used for a relay of communication for the remote support between an image processing apparatus and an information processing apparatus;
  - assign, for each connection being made from the image processing apparatus, one of the plurality of memory regions to the image processing apparatus as a memory region to be used for undergoing the remote support;
  - associate identification information of the image processing apparatus with identification information of the information processing apparatus in a case where the remote support for the image processing apparatus is started by the information processing apparatus; and
  - in a case where a resumption of the remote support is requested from the information processing apparatus after a reconnection by the image processing apparatus is performed, identify a memory region newly assigned, in accordance with the reconnection, to the image processing apparatus that is a target of the remote support, based on the identification information of the image processing apparatus associated with the identification information of the information processing apparatus, and transmit information for using the identified memory region to the information processing apparatus.

11. The communication system according to claim 10, wherein the information processing apparatus includes a display unit that displays, on an operation screen, a resume button for making an instruction to the relay server to request a resumption of the remote support for the image processing apparatus after the reconnection to the relay server by the image processing apparatus is performed.

12. A method of controlling a relay server that relays communication between at least one image processing apparatus and at least one information processing apparatus that performs remote support for the image processing apparatus, comprising:
- managing a plurality of memory regions on the relay server each of which is used for a relay of communication for the remote support between an image processing apparatus and an information processing apparatus;
- assigning, for each connection being made from the image processing apparatus, one of the plurality of memory regions to the image processing apparatus as a memory region to be used for undergoing the remote support;
- associating identification information of the image processing apparatus with identification information of the information processing apparatus in a case where the remote support for the image processing apparatus is started by the information processing apparatus; and
- in a case where a resumption of the remote support is requested from the information processing apparatus after a reconnection by the image processing apparatus is performed, identifying a memory region newly assigned, in accordance with the reconnection, to the image processing apparatus that is a target of the remote support, based on the identification information of the image processing apparatus associated with the identification information of the information processing apparatus, and transmitting information for using the identified memory region to the information processing apparatus.

13. A non-transitory computer readable storage medium storing a program for causing a processor to execute instructions to:
- manage a plurality of memory regions on a relay server each of which is used for a relay of communication for remote support between an image processing apparatus and an information processing apparatus;
- assign, for each connection being made from the image processing apparatus, one of the plurality of memory regions to the image processing apparatus as a memory region to be used for undergoing the remote support;
- associate identification information of the image processing apparatus with identification information of the information processing apparatus in a case where the remote support for the image processing apparatus is started by the information processing apparatus; and
- in a case where a resumption of the remote support is requested from the information processing apparatus after a reconnection by the image processing apparatus is performed, identify a memory region newly assigned, in accordance with the reconnection, to the image processing apparatus that is a target of the remote support, based on the identification information of the image processing apparatus associated with the identification information of the information processing apparatus, and transmit information for using the identified memory region to the information processing apparatus.

\* \* \* \* \*